United States Patent

Lidert

[15] 3,641,794

[45] Feb. 15, 1972

[54] MONITORING SYSTEM FOR A HELICAL COIL SPRING WINDER AND METHOD

[72] Inventor: Albert W. Lidert, c/o L.C. Co., 217 S. W. 33rd Court, Fort Lauderdale, Fla. 33300

[73] Assignee: Sam J. Carrozza, Oak Lawn, Ill. a part interest

[22] Filed: Jan. 26, 1970

[21] Appl. No.: 5,614

[52] U.S. Cl. ........................................72/4, 72/15, 72/131, 72/138
[51] Int. Cl. ..............B21d 55/00, B21b 37/00, B21f 11/00
[58] Field of Search............................72/14, 15, 131, 143, 4; 140/103; 83/61, 63, 358, 359, 370

[56] References Cited

UNITED STATES PATENTS 2,831,524  4/1958  Bache .................................83/370 X
3,427,838  2/1969  Rimmer ...............................72/15

Primary Examiner—Charles W. Lanham
Assistant Examiner—R. M. Rogers
Attorney—Robert L. Kahn

[57] ABSTRACT

A machine for winding helical springs is provided with a monitoring system to control accurately the length of finished springs; such monitoring system having a sensing means for determining if a finished spring length is correct, too long or too short and applying the sensing information to pitch control adjusting means to provide compensating changes in spring length when so required.

12 Claims, 7 Drawing Figures

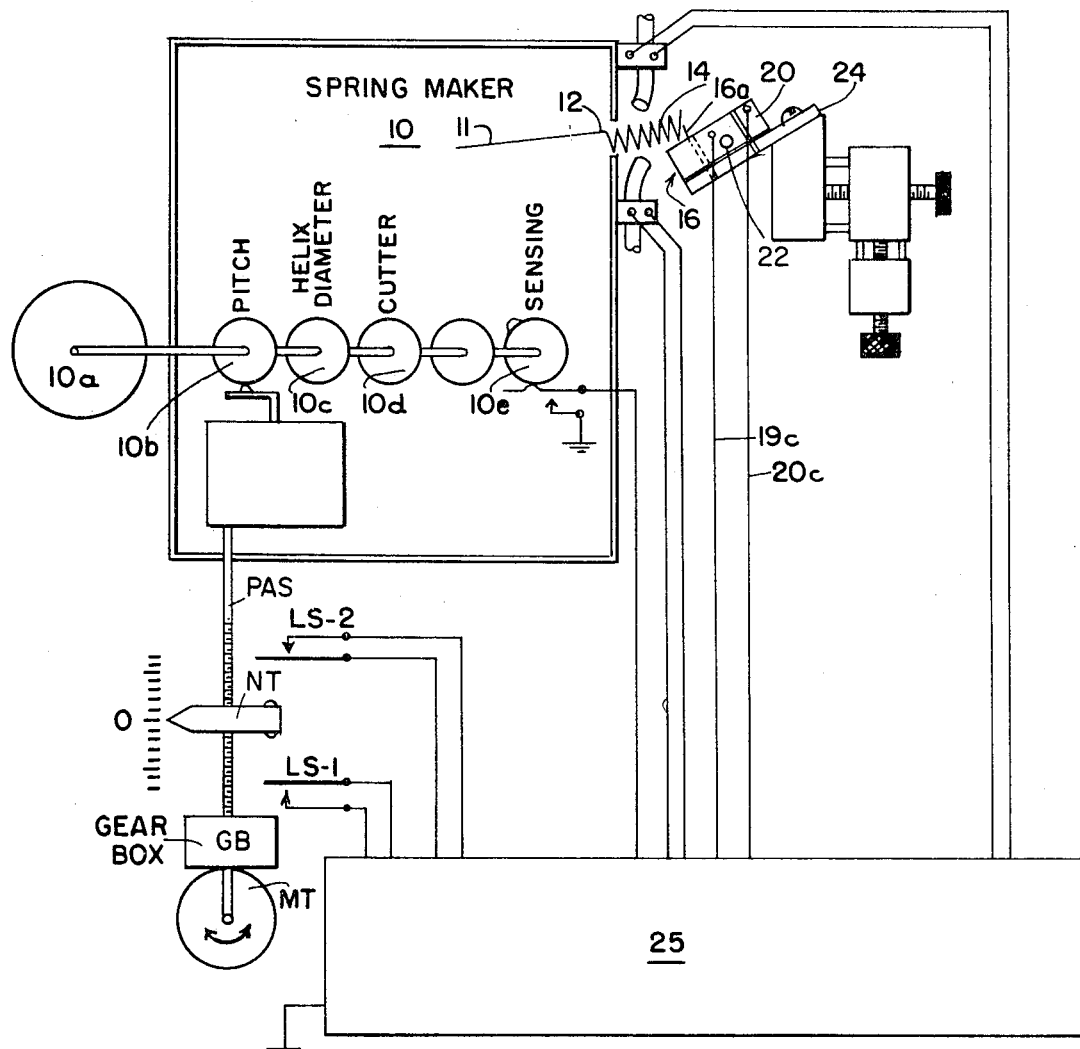
FIG. 1
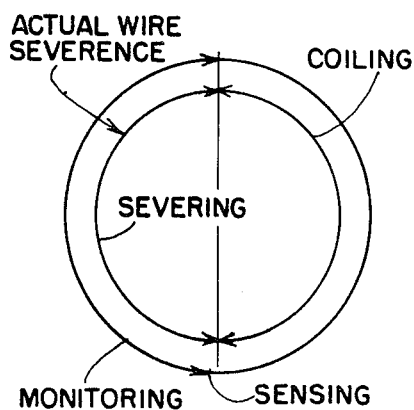
FIG. 2
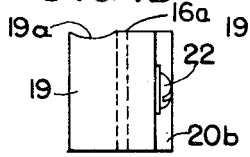
FIG. 1A
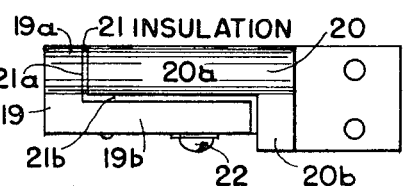
FIG. 1B FIG. 1C
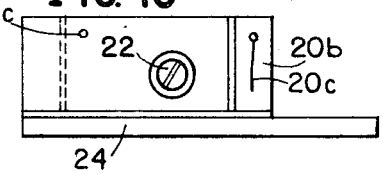
Inventor
ALBERT LIDERT

MONITORING SYSTEM FOR A HELICAL COIL SPRING WINDER AND METHOD

This invention relates to a monitoring system and method for a helical coil compression spring winder or maker set to wind springs of desired length. The invention takes advantage of the fact that compression springs are self-supporting. The monitoring system embodying the present invention supplements a spring maker mechanism to enable it to manufacture to close tolerances helical coil springs of desired lengths and particularly precision compression springs used for relatively light duty, such as in automotive, aircraft fields and numerous commercial devices within tolerances normally unattainable in coil spring makers.

While the invention is applicable to springs of all sizes of wire and for various lengths and diameters of helix, a particularly desirable field of application involves wire diameters of from about 0.005 inch to about 0.075 inch with spring helix lengths up to the order of about 1 or 2 inches. It is understood that these specific figures are given for purposes of illustration of a commercially desirable area where large quantities of precision compression springs are used. So long as a spring is generally self-supporting (can maintain its general straight helical configuration when supported only at spaced points along the helix length when horizontally disposed), the invention may be advantageously applied to machines making such springs.

Machines for winding helical coil springs are well known and as a rule are capable of operating with various sizes spring wire to wind various sizes of helices and cut to various lengths as desired. When coil springs are used for compression purposes the helix must have a desired pitch for coil spacing and the wire terminates at a helix end. Unlike tension springs, a compression spring usually is free of loops or straight lengths of wire at a helix end.

A precision compression spring requires, among other things, an accurate control of helix length in a finished spring. While machines for making such springs, when correctly set up, are accurate, wear and tear in such machines or variations in supply wire characteristics or both have an adverse effect upon helix spring length accuracy. The variation in characteristics of supply wire is particularly troublesome. Even in a new machine, accurately adjusted to predetermine the number of helix coils and thus control the helix length when the pitch is kept constant, it has been found that the lengths of individual springs manufactured from wire of indifferent quality will vary too much for precision spring specifications. Thus, such a machine when properly set up will generally produce springs having finished helix lengths within close limits, providing top quality spring wire is used. Even then, wire changes from one reel to a succeeding reel or within a reel may result in some variation of length of helix.

When wire of indifferent quality is used, variations along the wire in spring characteristics or tension in wire feed can be great enough to affect the lengths of finished compression springs. If such helix length is critical as in precision springs, inspection procedure presently used for classifying springs according to lengths is inefficient and expensive and frequently requires slower production from a machine. In all cases, current production technique results in a high rate of unsatisfactory precision compression springs.

The present invention hereinafter disclosed makes it possible not only to identify and, if necessary, separate finished helical compression springs into as many as three categories at the winder (springs of correct length, too short and too long springs) but more importantly, the invention makes it possible to change the pitch adjustment of the coil spring maker when necessary because of undesired length by an increment for changing the length of succeeding finished springs in a compensating sense. Complete compensation in finished spring length for variations in wire characteristic usually occurs within one or two spring winding cycles. Due to the multiplying factor on helix length of a change in pitch, a small pitch change can produce a significant change in helix length.

The invention also contemplates adjustable means for stopping a machine and providing a warning to indicate an excessive accumulation of incremental changes in helix pitch from a preset zero value. The means for stopping a winder may be adjusted to embrace any desired range of pitch control, either above or below a theoretical preset zero value and may be used as a means to indicate that the quality of wire being used is not commensurate with the accuracy requirements for spring length.

An additional advantage is that even if finished springs do not require close tolerances for helix spring length (as where springs may vary in helix length) a winder monitored by a system embodying the present invention tends to maintain finished coil springs within length limits determined by the setting of the monitoring system. Hence, even if all helical springs are retained, they are, for the most part, more uniform in length. Thus, by virtue of the present invention, a much greater uniformity of helix length of coil springs is obtained even when great accuracy in spring length is not necessary. The present invention makes it possible to provide more generous tolerances for usable spring wire stock to make acceptable coil springs within prescribed length limits.

The invention provides a sensing means useful for classifying the helix length of a finished compression coil spring and includes a sensing head over which the leading end coil of a spring advances during coiling. The surface of the head has parts of electrically conducting material separated by electrically insulating material over which the leading coil may pass. As the leading coil advances during coiling it rests first upon the nearest conducting sensing head part. A finished spring is too short, if the leading coil does not advance further. If the leading end coil of a coiled spring finally stops at the insulating part, then such spring is of satisfactory length. If the leading end coil of a coiled spring finally stops upon the furthest conducting head part, then such spring is too long. The final determination of spring length classification is accomplished during an instant of time after spring coiling is completed but before the coiled spring is cut from the parent body of wire. The mechanical action of effecting pitch adjustment (if required) and, when used, classifying cut springs into different groups for storage is initiated quickly and occurs after coiling. The succeeding spring making cycle is initiated with pitch control action, if necessary, accomplished or partly accomplished, depending upon the speed of mechanical response.

A spring maker monitored by a system embodying the present invention may, if desired, have its normal preset pitch setting corrected as frequently as wire conditions necessitate. Providing that variations in pitch of the monitoring system are within the extremes determined to be workable, such a machine will turn out finished springs which, if required, have been classified for helix length with minimum variation in length during production except when the warning part of the system operates to stop coil winding because of excessive pitch adjustment range or calls attention to this condition. The operating time of the spring length determination, which must occur between the end of spring coiling and end of cutting the coiled spring free of the parent wire, is an electronic function and involves a change in the electronic condition of one or more transistors (or vacuum tubes if used). The change in condition refers to conducting or nonconducting and with mechanical switch operation may be easily completed in several milliseconds. Once the coiled spring classification determination or sensing has been completed, the actual mechanical monitoring action, involving response of fast-acting relays and electric motors and valves can be initiated. The spring length classification, involving sorting, must be completed before a coiled spring is cut. The pitch control adjustment should be completed as quickly as possible and usually can be accomplished before a succeeding spring is finished. Generally, a pitch correction is effected fast enough so that the succeeding spring after the sensed spring will have a desired length, the wire characteristic changes usually permitting this action. Spring production speeds of over 200 springs per minute may be attained. Consequently, a coil spring winder equipped with the new monitor system may operate at rated speed.

While the spring length sensing means is capable of separate use in connection with a coil winder for effecting classification of spring lengths, it is preferred to use the sensing means in conjunction with means for changing the pitch setting of the winder in a compensating direction to maintain a generally constant helix spring length.

The invention also contemplates disabling the monitor system to prevent pitch adjustment and spring classification action in the event that a piece of metal, as a spring, happens to short circuit the sensing head. In such case, a warning signal may be given, or the winder may be stopped or a powerful blast of air may be directed at the entire sensing head to blow the shorting member away from the head.

Additionally, the sensing system is designed to work with minute currents through a spring being tested to avoid heating effects. The monitoring system, once a monitoring cycle is initiated, will time itself to complete a monitoring cycle.

The invention will now be disclosed in conjunction with the drawings wherein:

FIG. 1 shows in generally diagrammatic form a spring making machine with the new monitor system coupled thereto and the sensing head in place.

FIGS. 1A, 1B and 1C are respectively top, end and side views of a sensing head construction.

FIG. 2 is a diagram showing a polar diagram of a spring-making cycle and a possible monitoring cycle.

Figure 3A:
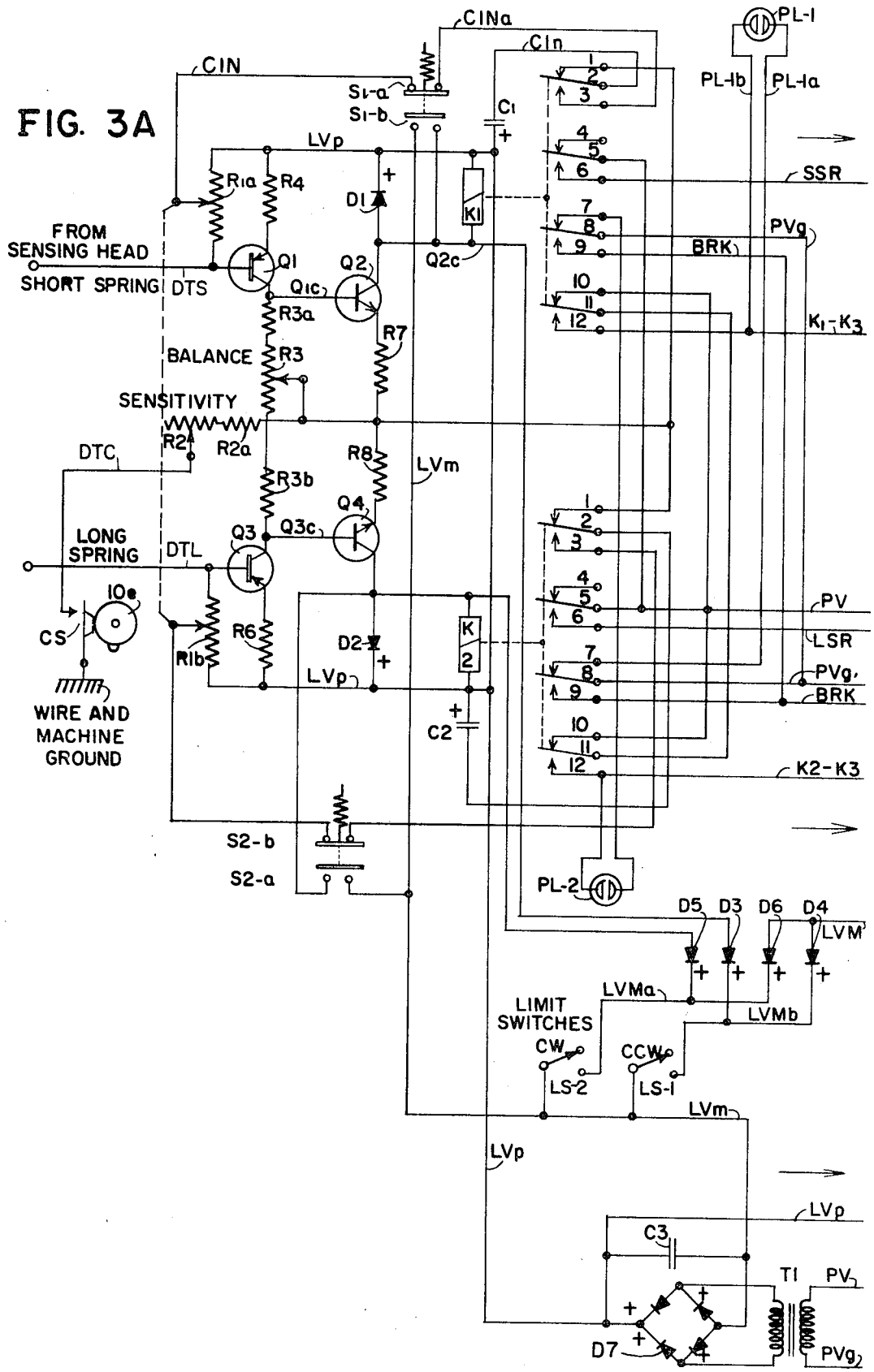
FIGS. 3A and 3B are parts of a composite wiring diagram of a monitor system, certain parts as limit switches, motor windings and air valve windings being repeated in the wiring to facilitate circuit tracing in various system conditions.

Referring first to FIG. 1, 10 is a coil spring maker of conventional design available on the market. Such spring makers receive spring wire 11 from a supply reel and feed such wire through the machine to coiling point 12 where the spring wire is coiled in helical form, the coiled helical spring being fed forwardly from the coiling point. Spring makers of the type here considered can generally be adjusted or set up to wind coil springs of desired helix diameter and predetermined pitch and helix length to be made from wire having a desired gauge. Such winding machines are provided with adjusting means for changing the pitch over a limited range above or below a preset value, such range usually being small. As a rule, where substantial changes in pitch may be required, it is necessary to change gear ratios in winder mechanism.

Generally, machine 10 will have a main cam shaft 10a which is driven by an electric motor through a clutch and speed changer when necessary, the cams on such shaft controlling various winder functions in proper sequence. For example, cam shaft 10a may drive cam 10b for pitch control, at least one cam 10c for helix diameter, cam 10d for controlling cutter means located close to the coiling region. In some winders, some cams may be driven from other shafts. In any event, shaft 10a will control the timing and operation of the various functions of a machine beginning with feeding wire, coiling the wire and, when definite spring lengths are to be cut, then the winder will have a definite control for determining the length of a spring. As rule, shaft 10a, as the main drive shaft, will have a definite relation between the angle through which shaft 10a turns and the complete cycle of operations to produce a spring.

Most machines provide for coiling and cutting one spring for one turn of shaft 10a. The present invention is not dependent upon this precise ratio and instead a complete spring making and cutting cycle of operations may occur for one half a turn or two turns of shaft 10a or any other desired ratio. In any event, a complete spring-making cycle during which the coil spring is coiled a predetermined number of turns and cut from the parent body of wire may be plotted on a polar diagram illustrated in FIG. 2 to show 360° for the complete spring making cycle. Whether such 360° corresponds to 360° of rotation of shaft 10a or any other angle is immaterial to the invention.

Referring to FIG. 2, in many winders a spring making 360° cycle is initiated and goes through a coiling phase over an angle of about 180° as an example. The remainder of the spring making cycle, involving cutting of the coiled spring will take up the remaining part of the cycle, here 180°. In any event, whether coiling takes up 180° of a spring-making cycle or more or less, all winders allow a substantial portion of a winder cycle for effecting cutting of a coiled spring.

Since the invention contemplates a momentary sensing of a finished but uncut spring length, part of the spring-making cycle following winding but prior to spring severance must provide for electronic sensing of the coiled spring length. In practice, the electronic sensing phase only initiates a complete monitoring cycle. The monitoring system itself, once started, provides a definite time interval within which the entire monitoring cycle takes place. The electronic sensing involves the closure of a circuit, as by a switch, to change the electronic condition of nonmechanical components as transistors and can easily be accomplished in several milliseconds.

Cam shaft 10a drives cam 10e, having a rise over an angle of say 15°, and timed accurately with respect to spring coiling and functions to initiate monitoring immediately upon completion of coiling and prior to actual wire severance. The sensing action is so fast, even with a mechanical switch operated by cam 10e, that a winder running at full speed can easily provide sufficient sensing time after the end of coiling and before the actual physical separation of a coiled spring from the parent wire without interfering with winder operation. Actual sensing and effecting circuit changes to initiate mechanical response of motors and valves only require several milliseconds and can usually be accomplished in winders without changing timing. This is because the mechanism for cutting requires some time to actually respond to a cam initiating such action. Furthermore, monitoring activities, as discharging classified springs and adjusting pitch control can be initiated immediately after sensing. So long as spring sorting action on a coiled spring is ready for spring severance, and pitch adjustment is effected prior to subsequent coiling (or at most in time for a second subsequent coiling) timing for monitoring is flexible.

After coiling has been completed, in the assumed example this is at the end of 180° of a spring making cycle, the remainder of the cycle normally provides for spring severance. The actual separation of the coiled spring from the main body of wire does not occur immediately at 180° of a cycle. Due to lag in physical movement of various parts of a winder, actual cutting occurs later in the cycle. Sensing of the spring length occurs prior to actual severance and is so fast that the cutting phase of a cycle can begin at any part of the cycle after 180° (as about 182°–183°) providing wire severance occurs late enough to provide for the physical responses of parts in monitoring. The operation of parts to control guiding spring discharge into an appropriate bin (when required) must be ready before a spring is severed. Actual severance may occur at a suitable time prior to the end of a spring making cycle. For example, actual severance may occur at about 300° to 330° on the polar chart. Assuming speed of operation of about 12,000 springs per hour, about 3⁻ springs per second will be made. Thus, a spring-making cycle of 360° will correspond roughly to about 300 milliseconds. Such a timing arrangement will be adequate for response of air valves in connection with directing a severed spring.

Insofar as pitch adjustment is concerned, timing on this is generally independent of spring severing and so long as such pitch adjustment is completed, preferably before the end of a spring-making cycle, or at the most before the end of a succeeding spring-making cycle, the benefits of the present invention may still be retained. In fact, unless excessive pitch adjustment is necessary, adequate pitch adjustment can usually be complete by the time a succeeding spring-making cycle is well started.

It is evident that by utilizing fast-acting mechanical parts, the monitor system embodying the present invention may readily accommodate maximum production of conventional spring makers without requiring more than retiming the end of coiling and severance of a spring.

Spring maker 10 has readily adjustable means for varying pitch over a suitable range. The pitch adjustment is usually available from outside of either the side or top. An adjustment involves, as a rule, rotating a threaded part. For example, reference is made to U.S. Pat. No. 3,472,051, dated Oct. 14, 1969, and earlier patents referred to therein showing various spring makers to which the invention may be applied. In addition, reference is made to various models of spring makers manufactured by The Torrington Mfg. Co. of Torrington, Conn., one such model being the W–11A segment-type machine.

In the block showing of spring maker 10, pitch cam 10b may be two cooperating cams and associated means as cam followers and various levers for pitch adjustment. The rear end of a coiled spring is retained by metallic portions of the machine at coiling point 12 and, until severance, is electrically grounded not only to the main body of spring wire but, in addition, is grounded to the spring maker where the spring is tightly gripped in readiness for severance.

As spring 14 is fed forwardly during coiling, the advancing lead end coil of spring 14 engages top face 16a of sensing head 16. The length of sensing head 16 extends in the general direction of forward travel of spring 14 and is preferably straight in this direction. The sensing head transversely of the length thereof may be straight or slightly concave to guide a spring along the length of the head.

Sensing head 16 is a composite structure including L-shaped metal plate 19 having portion 19a and 19b. Head 16 also includes L-shaped metal plate 20 having long body portion 20a and transverse portion 20b. Portions 19a and 20a are aligned along the direction of spring feed from the coiling point. Between these two metal plates is electrical insulating material 21. Insulating material 21 has portion 21a in the path of travel of the lead coil of spring 14 and has insulating portion 21b to complete the insulation between metal plates 19 and 20. The thickness of insulation separating the metal plates at face 16a will determine the tolerance in a finished spring of desired length.

In practice, insulation 21a may have a thickness of the order of from about 0.020 inch to about 0.040 inch. The thickness may be increased if fine tolerances are not required and may be decreased somewhat if precision control is required.

Plates 19 and 20 are retained by transverse bolt 22 either of insulation or disposed in an insulating sleeve to prevent bolt 22, if of metal, from short circuiting plates 19 and 20. The metal used may be of iron, brass or stainless steel. The insulation may be of plastic, ceramic glass, etc., or of an epoxy resin for cementing the plates together. The entire top face 16a of the sensing head should be smooth so that the advancing forward end of a coiled spring will not catch and preferably nonmagnetic to prevent any attraction between a spring and sensing head parts.

Electrical leads 19c and 20c are attached respectively to metal plates 19 and 20. Sensing head 16 has mounting plate portion 24 having suitable apertures therethrough and electrically insulated from metal plates 19 and 20. Mounting portion 24 may be of metal or insulation. If metal is used, it should be insulated from plates 19 and 20. Mounting portion 24 is adapted to be securely bolted to some fixed support and is preferably mounted in such a way that the distance and position of the sensing head with respect to the coiling point may be accurately adjusted. The mounting means should permit the sensing head top face 16a to be inclined so that the lead end of spring 14 will touch and rest upon the sensing head top surface and climb uphill as the spring is fed forwardly. As an example, sensing surface 16a of the head may be inclined at an angle of about 30° along the direction of spring feed (this is not critical and the angle may be varied). The orientation must be such that a coiled spring must be supported at its rear end by the spring maker and at the front coil only by the sensing surface 16a.

As has been previously pointed out, electrical sensing plates 19 and 20 respectively function as electrodes for positively sensing too short a spring or too long a spring. A spring of correct length will have its lead coil come to rest on insulation 21. It is understood that the angle of inclination of sensing face 16a of the sensing head as well as the stiffness of a coiled spring and the relative orientation of the entire head all cooperate to limit metallic contact of the body of a coiled spring which is free of the spring maker to the lead coil. Thus, when a spring has been completely coiled but not severed, only the lead coil will come to rest on the sensing surface or face 16a at a region determined by the length of the coiled spring. The coiled spring remains in this final sensing position until cut from the main body of wire.

The dimensions of the sensing head and the mounting of such head with respect to the coiling point will vary with the spring dimensions and the tolerances of the spring length. In general, it may be desirable to have a number of different sensing heads for different sizes of springs to be manufactured.

Cam 10e controls any suitable electric switch for completing a circuit to momentarily energize a sensing circuit. While a mechanical switch is illustrated, any suitable fast-acting means for affecting the conductivity of a circuit may be utilized. As an example, instead of the rise in cam 10e mechanically operating a switch, the rise may be used to interrupt a beam of light so that a photocell may have its electrical condition changed for triggering a vacuum tube or transistor to change electrical conditions for generating a pulse to be fed into an amplifier. Other means based on magnetic phenomena may also be used instead of mechanical switches to effect a change in the conducting condition of the input of an amplifier. A circuit change may be obtained in timed relation to cam 10e so that a change in the electrical condition of an amplifier input may be instantaneously obtained.

Figure 3B:
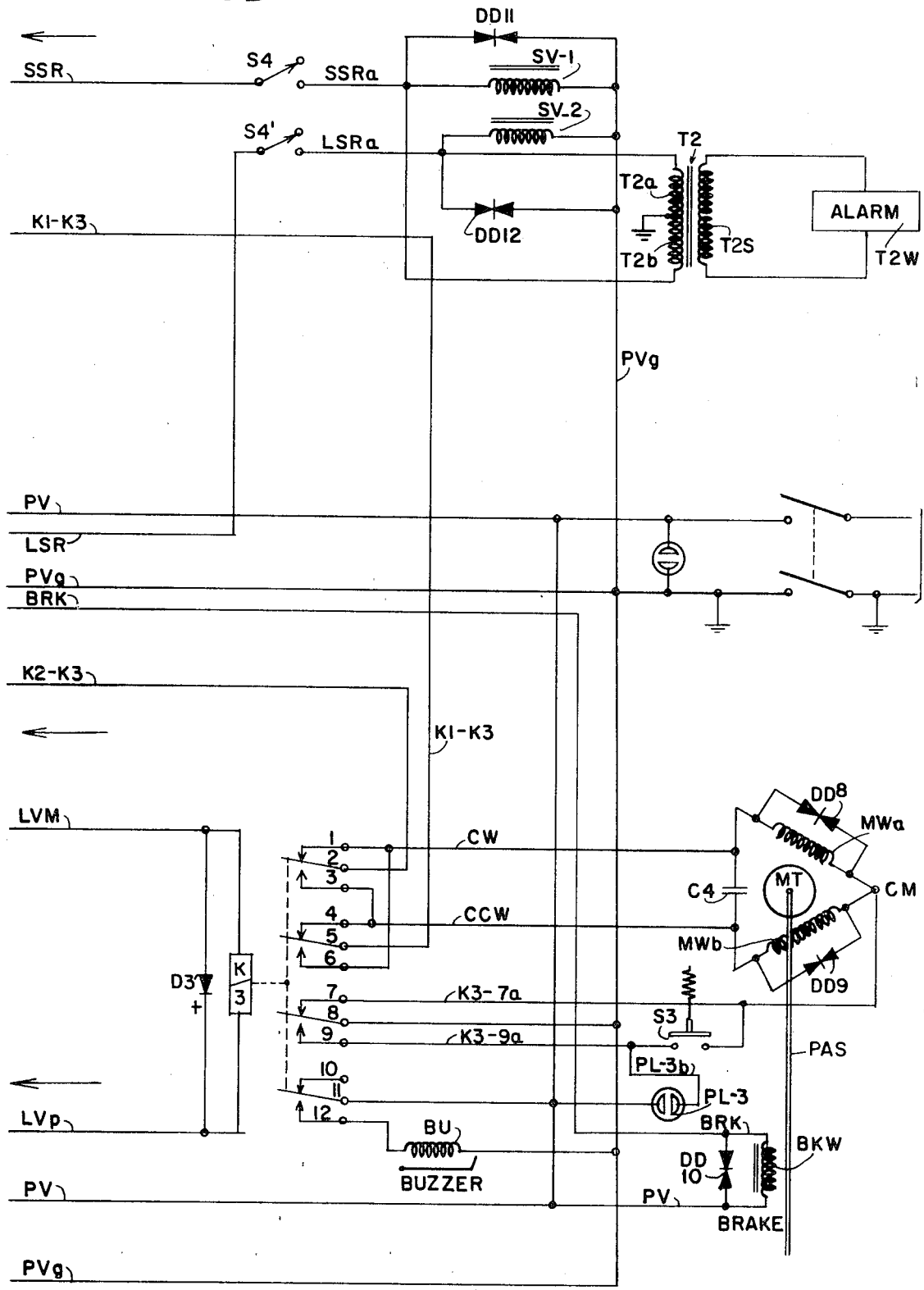

Sensing head leads 19c and 20c go to the input of the monitor amplifier and control proper generally designated as 25 in block form. A complete circuit arrangement is illustrated in FIGS. 3A and 3B arranged to show one complete monitor system. The detailed wiring is shown in the drawing and circuits will be traced in connection with a description of the operation of the system. For convenience, certain parts as limit switches, cam operated switch, motor and air valve windings are shown in the circuit drawings so that circuits may be traced with minimum reference to FIG. 1.

Wires 19c and 20c from the sensing head lead to input wires DTS and DTL respectively. Switch CS controlled by cam 10e has its high side connected to wire DTC and its low side grounded to the spring maker frame.

Wire DTS goes to the base of PNP transistor Q1 normally at cutoff in quiescent condition with no signal from wire 19c. Transistors Q1 and Q2 are connected as illustrated so that a negative pulse to the base of Q1 (when cam 10e closes switch CS to ground) results in a positive pulse at the emitter of NPN transistor Q2. Transistors Q1 and Q2 provide a one channel amplifier for detecting springs that are too short while transistors Q3 and Q4 provide a channel to detect springs that are too long. The two channels are duplicates and operate similarly on their respective relays K1 and K2.

Normally, LVp may have a positive potential, as for example, 20–24 volts DC with reference to LVm. This will be the output of a full wave rectifier system using diodes D7 supplied with AC from the secondary of step down transformer T1, the primary of which is energized by 120 volt AC power line PV and PVg. The rectifier system has filter capacitor C3 of suitable value, as 1000 mf. across it. In the rest condition, capacitor C1 is fully charged to the potential between LVp and LVm. All wires directly connected to LVp and LVm are respectively indicated by such letters. The positive terminal of capacitor C1 is directly connected to LVp. The negative terminal of capacitor C1 is connected by wire C1n to relay contact K1-2.

Now assume that cam-operated switch CS is momentarily closed to ground electrode 19 for detecting a short spring. Normally, the potential of the base of transistor Q1 is equal to that of LVp. When electrode 19 is momentarily grounded, a negative pulse is injected to the base of Q1. This causes a positive pulse to appear at the Q1 output and raises the potential of the Q1 collector. This pulses the base of Q2 positively. The potential of the Q2 collector drops below that of LVp to energize the winding of relay K1. When the contacts for relay K1 are in an off-normal position, relay contacts K1-2 and K1-3 close to provide a discharge circuit for capacitor C1 through a part of R1-a.

The negative potential of C1 appears at the wiper of potentiometer R1-a (the entire resistance of R1-a is ordinarily quite high, such as 10,000 ohms) and biases the base of Q1 negatively to keep Q1 conducting for a desired time. So long as Q1 remains conducting, Q2 will also conduct and maintain relay K1 closed. By having C1 fairly large (as for example 50 microfarads) the time constant for C1 and portion of R1-a (beyond the potentiometer toward the plus side of C1) may be ample for keeping relay K1 closed. As C1 discharges, the negative potential at the wiper of R1-a will rise until Q1 cuts off. Q2 then cuts off and the potential of Q2c rises and causes relay K1 to open.

When relay K1 is closed, contacts K1-5 and 6 close the circuit from the hot 120-volt wire PV to short spring reject wire SSR and manual switch S4 (when the latter is closed) to SSRa and then through the operating winding of solenoid valve SV1 to the power voltage ground PVg. Thus, an appropriate air blast will be initiated for rejecting a spring as being too short.

When K1 is closed, contacts K1-8 and 9 close a power circuit PV to energize the winding of motor brake BKW, normally in braking position, to release while relay contacts K1-11 and 12 close a power circuit PV (from K2-10) to K2-11 to K1-11 then to K1-12; to wire K1-K3 to K3-5 to K3-4 to wire CCW and winding MWb to wire CM to K3-7 then K3-8 to PVg for causing motor MT to turn in an appropriate direction to increase pitch and lengthen the individual springs.

The corresponding action occurs if the coiled spring is too long. In such case, transistors Q3 and Q4 conduct to effect the close for a definite time of relay K2 and permit capacitor C2 to discharge.

Relay contacts K2-1 to 3 inclusive function for capacitor C2 exactly as K1-1 to 3 inclusive function for capacitor C1. Contacts K2-5 and 6 function to impress power voltage from wire PV on wire LSR for long spring reject by energizing winding SV-2 for blowing a long spring in the proper direction. Contacts K28 and 9 impress power from PV to brake winding BKW while contacts K2-11 and 12 impress power from PV on motor winding MWa. Regarding the latter connection, winding MWa has its high potential terminal connected to wire CW going to K3-1 and K3-6. K3-1 is connected to K3-6 and by wire K2-K3 to K2-12; then K2-11; to K1-11; to K1-10 and finally to PV.

In the event that a short circuit develops across the electrodes of the sensing head, relays K1 and K2 are both energized but the wiring of the relay contacts prevents the operation of motor MT. Relay contacts K1-10 and K2-10 leading to line voltage PV are isolated from both windings of motor MT. Brake winding BKW is energized to release brake BKW from normal braking position at contacts K1-8 and 9 and also at K2-8 and 9. This action is inherent in the wiring and is meaningless. It could be eliminated by adding a movable and normal contact to each of relays K1 and K2.

It should be noted that with relays K1 and K2 energized, that wires SSR and LSR both operate to energize valve windings SV-1 and SV-2 to cause two blasts of air which will blow the top of the sensing head and perhaps clear it of whatever is shorting it.

When both air blasts are on, an alarm circuit becomes energized for calling attention to a short or for stopping the spring maker. This alarm system is as follows. From wires SSRa and LSRa wires SSRb and LSRb branch off and are connected to the end terminals of windings T2a and T2b of transformer T2. Windings T2a and T2b are connected to PVg. Transformer T2 has secondary winding T2S connected to an alarm load T2W. When both SSRa and LSRa are connected to 120-volt PV line, current in both halves of primary T2a will blow. The two windings T2a and T2b are magnetically in series aiding and will have say about 50 volts in secondary T2S. This will operate alarm T2W. When the monitor system is operating normally, wires SSRa and LSRa will never be live simultaneously, since relays K1 and K2 should not close simultaneously.

In such case, only half of the T2 primary windings may be energized, the remaining half not being used. In fact, the remaining half will be in series with the inactive winding of the air-valve (not being used at the moment) to be connected to PVg and thus function as two separate chokes, connected in series and grounded to PVg. As a result, transformer T2 will function inefficiently, if at all, and T2S will have insufficient voltage to operate alarm T2W.

In the event that pitch adjustment at the spring maker goes too far in either direction, so that nut NT will travel and close normally open switch LS-1 or LS-2, the monitor system is so arranged that attention is called and no springs are passed as correct in length. These switches are normally open but when one is closed, will connect LVm from the power supply to LVMa or LVMb, depending upon which limit switch is closed. Positive wire LVp connects to one terminal of relay K3 and permits current to pass through winding K3 to LVM and through one of diodes D4 or D6 through the closed limit switch and finally to LVm.

If limit switch LS-1 is closed, a circuit for energizing K-3 is established—LVp to K3 to LVM through diode D4, wire LVMb, LS-1; wire LVm. When K-3 closes, warning light PL-3 is energized—PV to wire PL-3a; lamp P1-3; K3-9a; K3-9; K3-8 to PVg. Also buzzer BU is energized to sound an alarm—PV to K3-11; K3-12; wire K3-12a; BU to PVg. At the same time, relay K1 is energized—LVm—LS-1—LVMb; steering diode D3; wire Q2C; winding K1 to LVp. When K1 closes, the effects are the same as described in connection with a short spring reject except that K1-12 connects through wire K1-K3 to K3-5 to K3-6 to wire CW to motor winding MWa to CM top open contact K3-7 and also to open switch S3. Motor MT is not energized. Lamp PL-1 is also energized to indicate that the motor direction is set to increase pitch.

The monitor system remains inoperative (except that if the spring maker still runs, the springs are all rejected) until an operator closes switch S3. This completes the motor power circuit—wire CM; K3-7a; switch S3; wire K3-9a; K3-9; K3-8 to PVg. It should be noted that when K3 is energized, the normal motor direction of rotation due to relay K1 is reversed. Hence when motor MT is energized, the pitch adjustment is away from the overtravel causing LS-1 to close. In this instance, LS-1 is the counterclockwise limit (because of short springs) so that motor MT turns clockwise and opens LS-1. When this occurs, relays K1 and K3 will be deenergized. S3 and lamp PL-3 will no longer be effective. Buzzer BU will also be silent. The machine operator should investigate to determine the cause of limit switch closure.

If the spring maker had not been stopped, a circuit breaker having a winding for opening the power circuit to the spring maker motor may be shunted across buzzer BU. This will stop the spring maker when BU is energized.

The monitor system may be manually controlled for establishing desired normal positions for limit switch action or timing. Lamp P1-1 is connected across contacts K1-12 and K2-7 and is energized whenever relay K1 closes. Switch S1-a is connected between wires Q2c and LVm and when closed will energize relay K1. When switch S1-a is closed, switch S1-b is opened to prevent C1 from discharging. These two switches are ganged to operate together. The desired midposition of the pitch adjustment between LS-1 and LS-2 can be adjusted by the S1 switches (or S2 switches, depending upon necessary motor rotation).

PL-2 is connected correspondingly to contacts K2-12 and K1-7. Thus when K2 is energized to close, PL-2 will light up, so long as K1 is open. The same is true for K1, so long as K2 is open. Switch S2-a is connected to LVm and Q4c and is similar in operation to S1-a in energizing relay K2. Switch S2-b corresponds in function and wiring to prevent C2 from discharging. Both the S2 switches are ganged together with the switch conditions being shown in normal quiescent conditions.

In a practical system, motor MT (an induction or synchronous type) will have a gearbox GB to reduce the normal running speed of the motor (which will usually be about 3,600 r.p.m. or about 1,800 r.p.m. down to the order of about 10 r.p.m. The output of the gearbox will drive pitch adjustment shaft PAS going to the actual member in the spring maker to be turned for pitch adjustment. Pitch adjustment shaft PAS will have a portion thereof threaded upon which will be disposed nut NT normally prevented from rotation by suitable means but free to move longitudinally along the axis of PAS. Nut NT carries a pointer which plays over a linear scale. Nut NT can go in one direction to close normally open limit switch LS-1 and in the other direction to close normally open switch LS-2. In the convention adopted here, motor MT turns clockwise (cw) to increase pitch, thus lengthening a spring and turns counterclockwise (ccw) to decrease pitch for shortening a finished spring.

Diodes D1 and D2 are shunted across the windings of relays K1 and K2 and are so poled that diode D1, for example, resists the flow of current from LVp to wire Q2c. In other words, diode D1 should not conduct across the winding of K1 in the direction of current flow as indicated (this assumes conventional flow of current from positive LVp to Q2c). However, diode D1 should conduct current in the reverse direction resulting from self-induced voltage in K1 when transistor Q2 suddenly cuts off. The same consideration applies to diode D2. Diode D8 operates similarly with respect to the winding for relay K3.

Diodes D4 and D6 function to block current of wrong polarity if either of the limit switches are closed. The same is true for steering diodes D3 and D5. The direction of current flow for the steering diodes has been set forth previously in explaining that relay K1 (or K3) is energized when LS-1 (or LS-2) is closed.

In the case of diodes D1 to D8 inclusive, the breakdown voltage for each should be substantially greater than the voltage between LVp and LVm for blocking purposes and should normally have low resistance in the forward direction. With respect to diodes D1; D2; and D8 the self-induced voltage generated by the decay of the magnetic field in each of these relays may be as high as three times or more of the normal operating voltage for energizing such relay. Thus, in the example given here of about 20 volts, diodes D1, D2 and D8 should withstand reverse voltages of the order of about 50 to provide a good margin of safety. Diodes D-3 to diodes D-6 inclusive should have somewhat greater reverse voltage limit and with the 20-volt low power supply in the LV system, the reverse voltages for these diodes to be withstood may well be in the order of about 100 volts to protect transistors against transient peaks.

Those operating windings connected to 110-volt power circuits are also protected by back-to-back diodes, thyrectors, shunted across each of the windings. For example, thyrectors DD8 to DD12 inclusive are shunted respectively across the windings of motor MT; brake BKW and air valve windings SV-1 and SV-2. These thyrectors should block reverse voltages of about 150 volts AC (approximate peak value in a 120-volt powerline) and conduct above such voltage so that the inductive kick from each winding will not damage any remaining portions of the entire system. The power contacts in the various relays K1; K2 and K3 are protected against destructive arcing.

Certain resistors form parts of potentiometer systems and separate additional resistors in series therewith are provided to limit the minimum amount of resistance in a circuit. For example, sensitivity resistor portion R2 (which in an exemplary system may have a value of about 50,000 ohms, may have fixed resistor R2a about 25,000 ohms so that the minimum resistance for sensitivity will be at least 25,000 ohms. Similarly, balancing resistor R3 preferably has fixed resistors R3a and R3b of about 1,000 ohms each connected to each terminal of R3. The function of this resistance network is to balance out differences between similar transistors, (Q1 and Q3 here). In an assumed example, R3 may have a value of about 10,000 ohms while R3a and R3b may each have a value of about 1,000 ohms. In a practical example, resistor R1a and R4 may each have values respectively of 10,000 ohms and 50,000 ohms. The corresponding resistors R1-b and R6 have values similar to R1-a and R4 respectively. Resistors R7 and 8 are very small and may each have a value of the order of about 1 ohm.

In a practical example, transistor Q1 (and Q3) may be silicon PNP-type T1-2 N3703. Transistors Q2 and 4 may be similar to NPN silcon transistors type T1-P33A. Capacitors C1 and C2 may be, as an example, 50 microfarads (Mf.). Capacitor C3 is a conventional filter capacitor of the order of about 1,000 mf. The bridge rectifier diodes D7 may each have a flocking voltage value of the order of about 50 volts and the rectifier system follows conventional practice.

In the example of the system discussed, embodying the present invention, with the exemplary values as given above, a current through a spring during sensing for short or long springs may be of the general order of about ¼ of a milliampere. Such a current is too small to create any heating or magnetic effects tending to increase or decrease the length of a spring. In fact, under normal production conditions, the length of time that a spring carries current is so short that even a substantially heavier current may be safely used. The voltage regulation of the LV power supply is not critical and in the assumed example given, it has been found when one relay, as for example K1, is in condition to be closed, the voltage across it may be about 19 or 20 volts and may drop substantially when two relays are on. As capacitor C1 discharges, the voltage across winding K1 due to C1 may drop to the order of several volts, assuming that relay K1 is of the type which can remain closed over quite a voltage range.

Normally, relay K3 and possibly K1 or K2 may close under conditions previously described. In such case, so long as the voltage between LVp and LVm is sufficient to close two relays, it is not important within substantial limits what the output of the LV power supply is. It is desirable that the power supply for closing relays have the ability to close at least two of the three relays and preferably three of the relays under the worst possible conditions. Thus, if a short across the sensing head develops, relays K1 and K3 should be closed. If, at the same time, a limit switch is closed and a short at the sensing head also exists, then all relays may be energized for closure.

It is apparent that each sensing channel, comprising Q1 and Q2 for example, as one channel together with its associated circuitry functions to initiate a monitoring cycle when Q1 is triggered from the sensing head to a conducting condition. Thus, the initial operation of Q1 and Q2, as an example, serves not only initially to close relay K1, but to keep it closed for a prescribed period of time. The closure of relay K1 provides for monitoring action to reject a short spring and to operate motor MT in the proper direction to increase the spring pitch.

The channel for long spring detection operates similarly. The system as a whole has the ability to monitor itself as well as the operation of the spring maker so that in the event of a short circuit in the sensing head or in the event of excessive pitch adjustment, warning is given. Additionally, manual switch means for putting the monitor system in appropriate condition corresponding to long or short springs are provided.

Capacitor C4 must be of the nonpolarized type for AC and must have appropriate capacitance for cooperating with either winding (the windings are similar) to control motor direction. Relays K1 to K3 inclusive are preferably of the fast-acting type which can close within a short time of the order of 5 to 10 milliseconds and should have substantial voltage range between closing and opening. The solenoid-type air valves controlled by the valve operating windings are of the type which are fast-acting and are available on the market. The air pressure involved is comparatively small—less than about 50 p.s.i. so that fast valve action is possible. The length of pipe between each valve and pipe nozzle should be generally equal and small. The ground for the powerline and the ground for the spring-making machine are connected together so that no difference in potential should exist between these grounds. As a rule, a two-wire power line will have one hot wire and the other grounded. All electronic gear (transistors, diodes, relays) may be in a cabinet separate from the machine proper.

The monitoring system may be applied to any conventional spring-making machine having a manual pitch adjustment. The entire monitor system illustrated in the drawings may be sold as a kit for application to machines for winding coiled springs for use in compression spring applications.

The helix diameter need not necessarily be constant. It is also possible to use the new sensing head and its associated circuitry for effecting spring length classification without recourse to pitch adjustment.

No attempt has been made to show accurate positioning of air nozzles for directing the path of springs that are short or long since such means are generally well known in the art of materials handling. For example, by controlling relative air pressures and providing chutes at various locations, selection for different classes of springs may be provided. The same applies to springs which may be produced by the machine when a short circuit at the sensing head causes relays K1 and K2 to be energized. In such case, the air nozzles may be so aimed that when both are operating, the springs are directed to still a different direction since such springs may have three different lengths mingled.

It is of great importance that an excellent electrical ground be established to the spring wire at some place. Such wire frequently will have a thin coating of oil or grease and it may be necessary to establish the wire ground back to the reel or have a suitable rolling contact provided. The voltage and current to be passed through the wire is quite small so that a sufficiently good ground for operation will not be difficult to establish. In addition, the sensing head surface must be smooth enough and so oriented and angled with respect to the oncoming spring from a coiling point that only the lead coil of a spring physically engages the sensing head surface. The fact that a metallic connection through the spring is provided for sensing current to flow makes for reliable monitor operation. Once a sensing current for an off-normal spring length has been established, thus initiating a monitor cycle, the remaining monitor operations are essentially independent of a spring. The sensing head structure may assume a variety of forms but must have a first and second electrically conducting surface separated by an insulating gap, located with respect to an oncoming coiled compression spring so that only the lead spring coil can engage the sensing surface to cooperate therewith during a brief sensing time.

What is claimed is:

1. In combination, a spring-making machine for manufacturing discrete helical compression springs from continuous wire stock, said machine being normally preset for winding a predetermined number of coils at a predetermined pitch to provide a predetermined axial length of compression spring after severance from the wire stock with such axial lengths of springs being subject to change due to variations in wire characteristics, said machine normally feeding a spring forwardly therefrom as coiling progresses so that upon severance, a finished spring is free of said machine, said spring-making machine including, as a part thereof, an adjustable pitch control to provide a limited range of pitch variation from the predetermined pitch, and a monitor system for controlling the operation of said machine, said monitor system including a sensing head having an active face along which the leading spring coil moves from the spring-making machine, said active face being oriented so that only the leading coil of said spring can touch said face and having two metallic electrically conducting portions separated by an insulating portion along the path of travel of said spring leading coil to correspond to short, correct and long spring, said monitor system including switch means operated by said machine in timed relation thereto for initiating activation of said sensing system after spring coiling and before spring severance, said sensing system including as an active circuit portion the completely coiled spring extending between the uncut end at the machine and the lead coil normally resting upon the active face of the sensing head, the sensing system thus determining, with respect to a predetermined, desired spring length, if a coiled spring prior to severance is of correct length, or too short or too long, and means responsive to such determination for varying the pitch setting in a compensating sense to change succeeding spring lengths.

2. A monitor system for a machine for making compression springs from wire stock, said machine including as a part thereof an adjustable pitch control and having means to make separate individual springs of predetermined length, said monitor system including a sensing head with an active face having an electrically conducting portion followed by an insulating gap portion and thereafter having an additional electrically conducting portion and being adapted to be mounted adjacent the coiling point of a spring-making machine so that only the leading coil of a spring, as it is fed from said coiling point, engages said active face and after such coiling is completed has the leading coil rest upon electrically conducting or electrically insulating material depending upon the completed length of the spring, said head face upon which the leading spring coil end travels being smooth so that said coil end may progress along the head face until coiling is accomplished, switching means associated with said machine to be operated in timed relation to said machine for initiating a monitoring cycle after completion of coiling and prior to spring severance, said system including electrical circuits part of which will include the coiled spring after coiling but prior to severance, the circuit conditions depending upon whether the leading spring coil is resting upon an electrically conducting surface or upon the insulating surface, said system including a reversible motor adapted to be coupled for driving the pitch adjustment on said spring-making machine in a pitch-compensating sense to correct the pitch, if necessary.

3. In the operation of a helical coil wire spring-maker wherein spring wire from a parent body of wire is fed to a coiling region to produce a coiled spring having a definite number of coils with a definite pitch to produce a finished helical coiled compression spring of an axial length corresponding to the number and pitch of the spring coils, each finished spring being severed from the parent body of wire, the steps which comprise: feeding the spring as it emerges from the coiling point on an upwardly inclined sensing surface having successively electrically conducting, nonconducting and conducting portions along the direction of travel of said lead coil so that only the lead coil rests upon said sensing surface, making a test, during the time in a machine-operating cycle between the end of coiling and spring severance, of the electrical continuity from the machine proper through the spring coils to the lead coil and then to said supporting surface below the lead coil, and, following such test, adjusting the operation of the machine to utilize the test information on spring length, the length of such nonconducting portion determining the tolerance for a spring of correct length.

4. In the method according to claim 3, the step wherein a change in pitch in a compensating sense is made.

5. In the method according to claim 3, the step wherein a spring, after severing, is discharged in a direction corresponding to the spring length.

6. In the method according to claim 3, the steps wherein a change in pitch in a compensatory direction is made and wherein the severed spring is discharged in a direction corresponding to the spring length.

7. The combination according to claim 1 wherein additional means responsive to such determination is provided for discharging severed springs in various directions corresponding to spring classification of correct, too short or too long.

8. The combination according to claim 4 wherein said monitor system includes means responsive to a short circuit on said sensing head surface for disabling said pitch adjusting means and said spring classifying means so long as said short circuit condition exists.

9. The construction according to claim 1 wherein said monitor system includes means for disabling further operation of said monitor system in the event that accumulated pitch adjustment in either sense exceeds a predetermined range limit whereby attention is directed to remedying machine operation or adjustment.

10. The combination according to claim 1 wherein said monitor system means to complete an electric sensing circuit has means for limiting the electric current in said sensing circuit to such a low value as to prevent any significant heat or magnetic effects in the sensed spring.

11. The combination according to claim 2 wherein circuit means including relays are provided for indicating an electrical short circuit at the sensing surface across the insulating gap in the event that such a short circuit occurs, said monitor system including means for suspending the operation of the monitor system insofar as pitch adjusting motor operation is concerned and means to indicate the existence of such a short circuit at said sensing head.

12. The combination according to claim 2 wherein means are provided for directing severed springs to travel in different directions depending upon differences in spring length as sensed by the monitor system.

* * * * *